US007246060B2

(12) United States Patent  
Geidl et al.

(10) Patent No.: US 7,246,060 B2
(45) Date of Patent: Jul. 17, 2007

(54) NATURAL INPUT RECOGNITION SYSTEM AND METHOD USING A CONTEXTUAL MAPPING ENGINE AND ADAPTIVE USER BIAS

(75) Inventors: Erik M. Geidl, Bellevue, WA (US); David V. Winkler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 09/993,331

(22) Filed: Nov. 6, 2001

(65) Prior Publication Data

US 2003/0088410 A1 May 8, 2003

(51) Int. Cl.
*G10L 15/26* (2006.01)
(52) U.S. Cl. .................. 704/235; 704/270; 704/231
(58) Field of Classification Search ............. 707/102, 707/2; 704/235, 254, 270, 275, 243, 255, 704/251, 231, 246, 276, 9, 10; 382/187
See application file for complete search history.

(56) References Cited

U.S. PATENT DOCUMENTS 5,809,497 A * 9/1998 Freund et al. .............. 707/2
5,963,666 A * 10/1999 Fujisaki et al. ............ 382/187
5,970,448 A * 10/1999 Goldhor et al. ............ 704/235
6,078,886 A * 6/2000 Dragosh et al. ............ 704/270
6,741,994 B1 * 5/2004 Kang et al. ................ 707/102
6,834,264 B2 * 12/2004 Lucas et al. ............... 704/235
6,996,528 B2 * 2/2006 Morin et al. ............... 704/254

* cited by examiner

*Primary Examiner*—V. Paul Harper
*Assistant Examiner*—Huyen X. Vo
(74) *Attorney, Agent, or Firm*—Workman Nydegger (57) ABSTRACT

A natural (e.g., handwriting or speech) input recognition system and method that uses contextual mapping to improve recognition accuracy by biasing recognition based on the context of an input field. As natural input data is being entered into an application field, the context (type) of the field is determined and used to locate context-based validation rules and context-based user bias data. When entry is complete, the context-based validation rules and context-based user bias data are provided to a recognition engine with the natural input data. The recognizer biases its recognition result by using the rules and the user bias data to recognize the natural input. A field signature generator is described that determines each field's context, independent of the application, and a data harvesting engine is described that automatically collects user bias data from various data stores.

26 Claims, 8 Drawing Sheets

NATURAL INPUT RECOGNITION SYSTEM AND METHOD USING A CONTEXTUAL MAPPING ENGINE AND ADAPTIVE USER BIAS

FIELD OF THE INVENTION

The present invention relates generally to computing devices, and more particularly to handwriting and speech input used with computing devices.

BACKGROUND OF THE INVENTION

Contemporary computing devices allow users to enter natural input data such as handwriting or speech data. For example, such devices accept handwritten words (e.g., in cursive handwriting and/or printed characters), characters and symbols (e.g., characters in Far East languages). The words, characters and symbols can be used as is, such as to function as readable notes and so forth, or can be converted to text for more conventional computer uses. Speech data may be similarly input and converted to text, and/or left in some audio-related file format.

To convert such natural-input data to text, as a user enters strokes representing words or other symbols onto a touch-sensitive computer screen or the like, or speaks into a microphone, a suitable recognizer (e.g., trained with millions of samples, employing a dictionary, context and/or other rules) is able to convert the handwriting data or speech data into dictionary words or symbols. In this manner, users are able to enter textual data without necessarily needing a keyboard. By way of example, one common type of handwriting recognizer compares characteristics and other features of electronic ink input by a user against a dictionary that maps the features to common text words to recognize words therefrom.

In many cases, recognition is fairly accurate, since the dictionary contains a word for the information that a user enters. Moreover, such recognizers can return probability-ranked alternates, or candidates, from which a user can select an alternate word choice when the user-intended word is not the one the recognizer considered to be the best match. Usually one of the words is the one the user intended, and a pop-up menu or the like that the user can quickly display and interface with enables the user to quickly select the intended word or symbol.

However, when the spoken input or written character combination that the user intended does not have a corresponding entry in the dictionary, often none of the candidates returned by the recognizer will be correct. As a result, the user has to resort to other means to input the intended text. For example, the user can type in or distinctly spell out exactly what characters are desired for the particular handwriting or speech input. Further, the user can add the character combination to a supplemental dictionary or the like and attempt to "train" the recognizer that this particular input corresponds to a given combination of characters, which need not be standard dictionary words. However, even if this solves the problem for that particular handwriting or speech input data in the future, at the very least such training is time-consuming, frustrating, and not very realistic in that the recognizer gets wrong what a human listener or reader would have interpreted correctly the first time.

As can be appreciated, such manual, after-the-mistake training is less desirable than having the recognizer get the right recognition result in the first place. Moreover, because the input is incorrectly recognized, any validation that may occur is meaningless unless and until the recognition is corrected. For example, a word processor may have a spell-checking mechanism, a spreadsheet may have a formula-validating mechanism, and an e-mail program may have an alias-validating mechanism, but if recognition is incorrect, these mechanisms operate on the wrong text.

In sum, recognition accuracy has substantial room for improvement. Recognition is especially poor when the input is not a common text word and thus not present in a full text dictionary. Manual training may be available to improve future accuracy, but is far less desirable than having the recognizer initially return the correct result.

SUMMARY OF THE INVENTION

Briefly, the present invention provides an input recognition system and method that significantly improves the recognition accuracy on natural input data (e.g., handwritten data, speech data and so forth) via a contextual mapping engine and by adapting to user bias data to bias recognition. To this end, the system and method essentially determine the context of what the user is inputting, and based on the context, provide the recognizer with information that biases the recognition process to results that are significantly more likely to be correct. To this end, in addition to the natural input data, context-related information comprising rules or the like (such as specifying allowed input), and/or user bias data (such as in the form of a dictionary, word list or the like that contains character combinations biased to the user's likely intent), are provided to the recognizer. The recognizer uses the user bias data and any rules information to interpret the natural input and return its result.

By way of example, a user can input natural data into an e-mail application program at a location (a field) that receives an e-mail address or e-mail alias. The context of this field is determined to be an e-mail address input field, and recognition rules for that field, along with a list of e-mail aliases and/or e-mail addresses comprising those that the user is likely to be entering, is provided to a recognizer. The recognizer biases its output based on the list and the recognition rules in some way, such as by using the list to look for a suitable match before searching a dictionary of standard language words, or by weighing the user bias data more heavily relative to other dictionaries. For example, the list may comprise those e-mail addresses or aliases that the user has sent messages to before, while the rules may exclude certain symbols that are not allowed in an e-mail address. Recognition accuracy is significantly increased because the rules eliminate non-conforming alternates and/or the recognition is biased to those character combinations (e-mail addresses) that the user is likely entering in the given field.

To determine the field type, each input location into which an executable program such as an application program can receive input data may be mapped to a unique field signature. By a unique field signature, it is generally meant that each field signature adequately differentiates a field from others, and while global uniqueness is not required, global uniqueness is one alternative that is viable. Field signature mapping can be accomplished for virtually any contemporary application program, including those already written and/or with no knowledge of natural (e.g., handwritten or speech) input. At least some of the field types via their field signature are associated with a factoid that may contain information such as criteria about the data that can be received by that field type. For example, a telephone number input field can be limited to numbers, dashes and parentheses, and thus a rule specifying criteria about what type of characters such a field can accept can be maintained in (or otherwise associated with) a factoid.

Also, a harvesting engine automatically constructs and maintains (e.g., in a background process) a user-specific database (user bias database) of entries for each field type that has an associated factoid. For example, the harvesting engine can access a data store on a machine to construct a database of e-mail addresses that the user has sent messages to or received messages from. The harvesting engine can similarly access a data store to obtain a list of telephone numbers, mailing addresses and so forth that the user has stored on the system. Each set of entries in the user bias database is mapped to a corresponding factoid.

In operation, the harvesting engine runs in the background, collecting user-specific data, and stores it in a local user bias database. When an executable program at runtime has a field that becomes a target of pen or speech input, an input system detects the input activity, and communicates with the field signature engine to generate a field signature for the field. A field mapping database is queried to provide an associated factoid for this field based on the field signature, and (if one exists) the factoid is retrieved. The input system uses the factoid (e.g., an identifier thereof, which may be the field signature) as a key to retrieve the user bias data for this field from the user bias database.

When the input system collects the natural input data from the user, the user-enabled input system submits the natural input data, the factoid, and the user bias data (e.g., a pointer to a list) to the natural input recognition engine. The natural input recognition engine processes the natural input data using the factoid and user-bias data, and returns a recognition result to the user-enabled input system. The user-enabled input system delivers data corresponding to the recognition result to the executable program, in the form of one or more computer codes, (e.g., an ASCII text string). The program receives the text string as if the user had typed the string into the field. Because the recognizer uses a field's context to determine a factoid and a user bias data set, recognition results are context-biased and thus significantly more accurate.

Other advantages will become apparent from the following detailed description when taken in conjunction with the drawings, in which:

DETAILED DESCRIPTION

Exemplary Operating Environment

Figure 1:
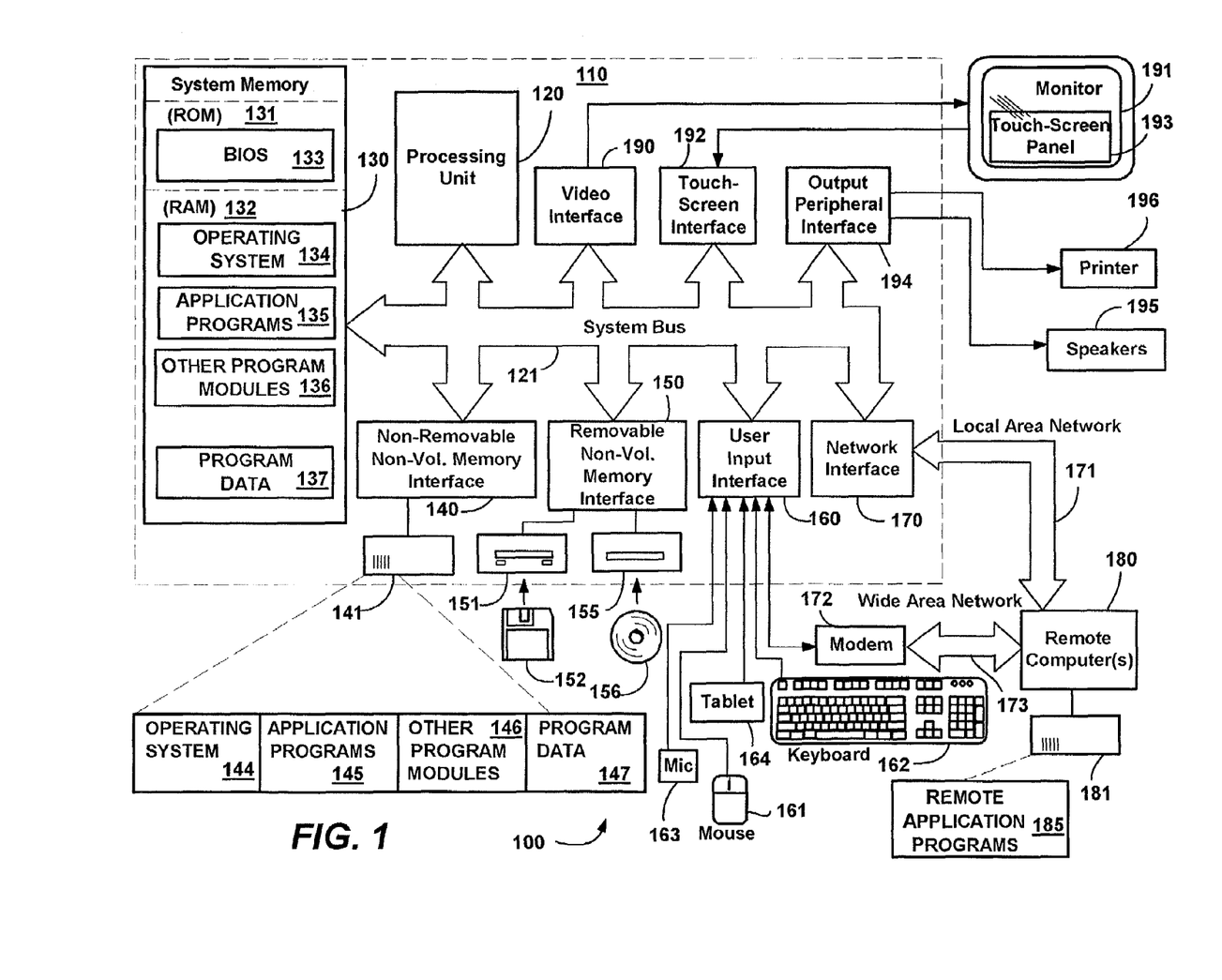
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Context-Biased Recognition

The present invention is primarily related to processing natural input data received by a computing device, such as speech and handwriting. Speech is generally composed of waveforms (e.g., representing phonemes), while handwriting is maintained in the form of electronic ink, which in general corresponds to a set of X, Y coordinates input by a user, and additional state information such as an "up" or "down" state. Notwithstanding, it will be appreciated that the present invention is applicable to virtually any type of user input that corresponds to words, characters or other symbols that can be mixed with and/or recognized as text. Thus, although for purposes of simplicity the present invention will be primarily described with reference to handwriting input and to a lesser extent speech, the present invention should not be limited in any way to handwritten input, speech and/or by the examples used herein.

As a further simplification, when handwriting, the user may be considered as entering ink input via a pen-tip (cursor) that writes on a tablet-like surface, such as including the touch-screen panel 193 or other such device such as the digitizer. Note that this may not be literally correct for all devices and/or in all instances. For example, some devices such as a mouse or a pen capture device do not have a real, physical tablet and/or pen-tip. For such devices, a virtual tablet-like surface may be assumed. In other instances, electronic ink may be generated by an application program or other software (such as when pasting ink into a field), in which event the tablet-like surface and pen-tip may both be considered to be virtual. Electronic ink is often more complex than simple X, Y coordinate data, and may have additional properties associated therewith. For example, tip pressure, angle data, writing speed, and so on may be maintained as part of the ink data. In general, electronic ink (and similarly speech data) may be maintained in any suitable form with any type of accompanying data.

Figure 2:
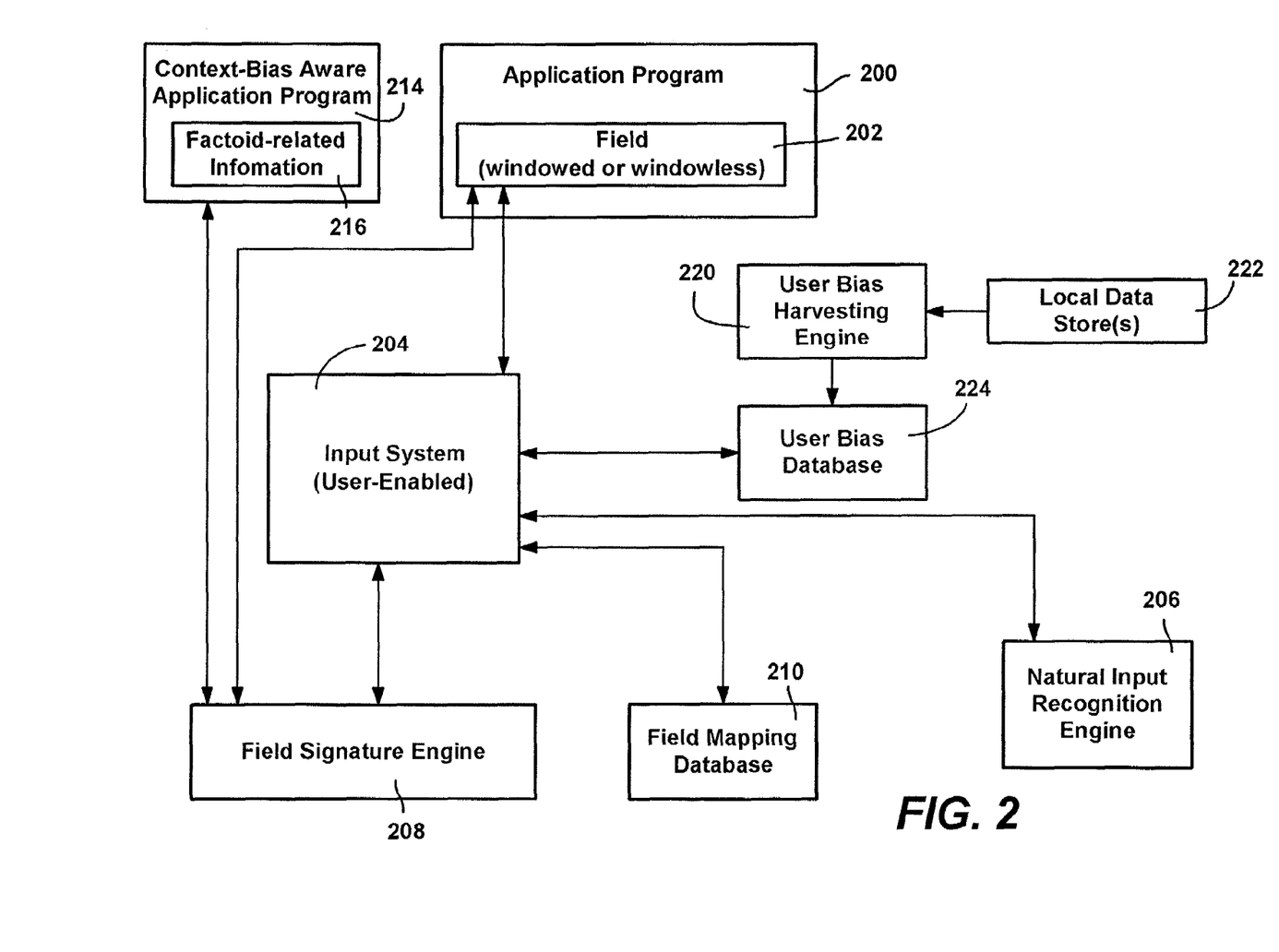
FIG. 2 is a block diagram generally representing components for implementing various aspects of the present invention.

FIG. 2 shows a number of components used in one implementation of the present invention. In FIG. 2, an application program 200, including a field 202 is represented as ready to receive user input. More particularly, the field 202 into which a user is directing input may comprise a window that has current input focus. For example, when an application's field (window or windowless) has input focus, a user typing on a conventional keyboard would see the typed characters appear as text in the current field. Note that while a user-mode application program is shown in FIG. 2, it is understood that any executable program or code, such as an operating system component, object and so forth that is capable of receiving user input, is equivalent, and the terms application, program, or executable code may be considered interchangeable when referred to in this context. Moreover, as will be understood, the program need not be aware that natural input is being received, but may be virtually any type of program that can at least receive computer codes as input data.

A user-enabled input system 204 includes generally any mechanism that is capable of gathering natural input data (e.g., electronic ink or speech waveforms) and transmitting this data to a natural input recognition engine 206. Such input systems generally receive a recognition result from the recognizer and return it in the form of computer codes (such as ASCII text) to the application program window having input focus. Typically this is accomplished by intercepting the input, sending it to a recognizer, and placing the recognition result in a message queue for the window that otherwise (except for an intercepting window or the like) has input focus. General examples of these types of mechanisms may be found in U.S. Pat. Nos. 5,946,406, 5,956,423 and 6,269,187, assigned to the assignee of the present invention.

In keeping with the present invention, however, instead of simply passing the natural raw data to the natural input recognition engine 206, the input system 204 is further configured to obtain contextual information regarding the field 202, and, based on that contextual information, may further obtain user bias data for that field 202. For context-based recognition, the input system 204 passes contextual-based information (e.g., a factoid, described below), the user bias data and the natural input data to the recognizer 206, as also described below.

To obtain the contextual information at run time of the application 200, the input system 204 calls a field signature engine 208 to obtain a field signature (identifier) for a given field (e.g., the field 202). Alternatively, the engine 208 can extract the field information more directly from the field 202, e.g., without using the input system 204 as an intermediary. The field signature obtained is essentially unique, in that each field signature adequately differentiates a field from others, at least per type of field, as described below with respect to FIG. 3. The field signature ultimately will fall into one of two categories, namely previously known and mapped into a field mapping database 210, or unmapped. Unmapped fields can be handled in several different ways, including simply instructing the natural input recognition engine to work in "full-dictionary" mode, and not implement any user data biasing and/or factoid logic.

In general, mapping the fields of an application is a process that is performed in preparation of run-time recognition. To map some or all of the fields of application, an entity (such as the provider of some or all of the various components of the present invention or a third party vendor) analyzes the various input fields for a given application and determines what type of data the field is intended to receive from a user. For each field, a factoid is developed, and added to the field mapping database 210. The factoid contains information such as rules and/or other logic that will help the natural input recognition engine 206 more accurately recognize the input. Note that a factoid can have no rules therein, (e.g., any input is allowed), but exist so that the recognizer will bias its result based on a set of user bias data, as described below. Typically, however, a factoid will contain some rules, and in general, the factoid can be viewed as an additional attribute of the natural input data.

By way of example, consider an application program that has a field for receiving a telephone number. Upon analysis, a factoid for that telephone number field can be developed with the logic that indicates that the only characters that the recognizer should return can be a dash character "-" or left and right parentheses "( )" or numerals zero through nine, (0-9). A space character may follow the parentheses. In addition, the factoid may include a rule or other logic that limits the total number of characters. Note that other characters and rules are possible, but in this example the rules are being kept simple and the field is limited to ten-digit dialing. Thus a factoid having the following associated information may be developed and stored as an entry in the field mapping database 210, indexed by the Field signature:

---

Field signature = "RichEdit321015Phone No."
Character limit = 14
Allowed characters = 0,1,2,3,4,5,6,7,8,9, ,()-
Allowed formats =   ???-???? (where ? indicates numeral)
                    (???) ???-????
                    ???-???-????

---

As can be appreciated, other factoids for other fields can be similarly set up, and no particular format, data structure or set of rules is required for factoids, other than that they be accessible in some way by an adequately unique identifier and be able to be interpreted by the recognizer. For example, each factoid may be maintained as a table entry in a database, an object, a file in a file system, a data structure and so forth. Various possible factoids are included in the table below (the number preceding the type, and the order, is not of significance, but only represents the alphabetical ordering of this particular table):

1. Address
2. Alpha Character (a single letter)
3. Any One Character
4. City
5. Country
6. Credit Card Number
7. Currency
8. Date
9. Day of Month
10. Day of Week
11. Digit Character
12. E-mail Address
13. EXCEL (e.g., =A4/B2)
14. File Names
15. First Name
16. Fraction (e.g., ½)
17. Gender
18. Hour
19. Language
20. Last Name
21. Middle Name
22. Minute
23. Month
24. Month Number
25. Name
26. Number
27. Percent
28. Phone
29. Punctuation Character
30. Regular Expressions
31. Second
32. State
33. Street
34. Time
35. Web Address
36. Wordlists
37. World Address
38. World Postal Codes
39. Year
40. Zip Code As can be appreciated, many other factoids are possible, such as those corresponding to fields for entering passwords.

Figure 3:
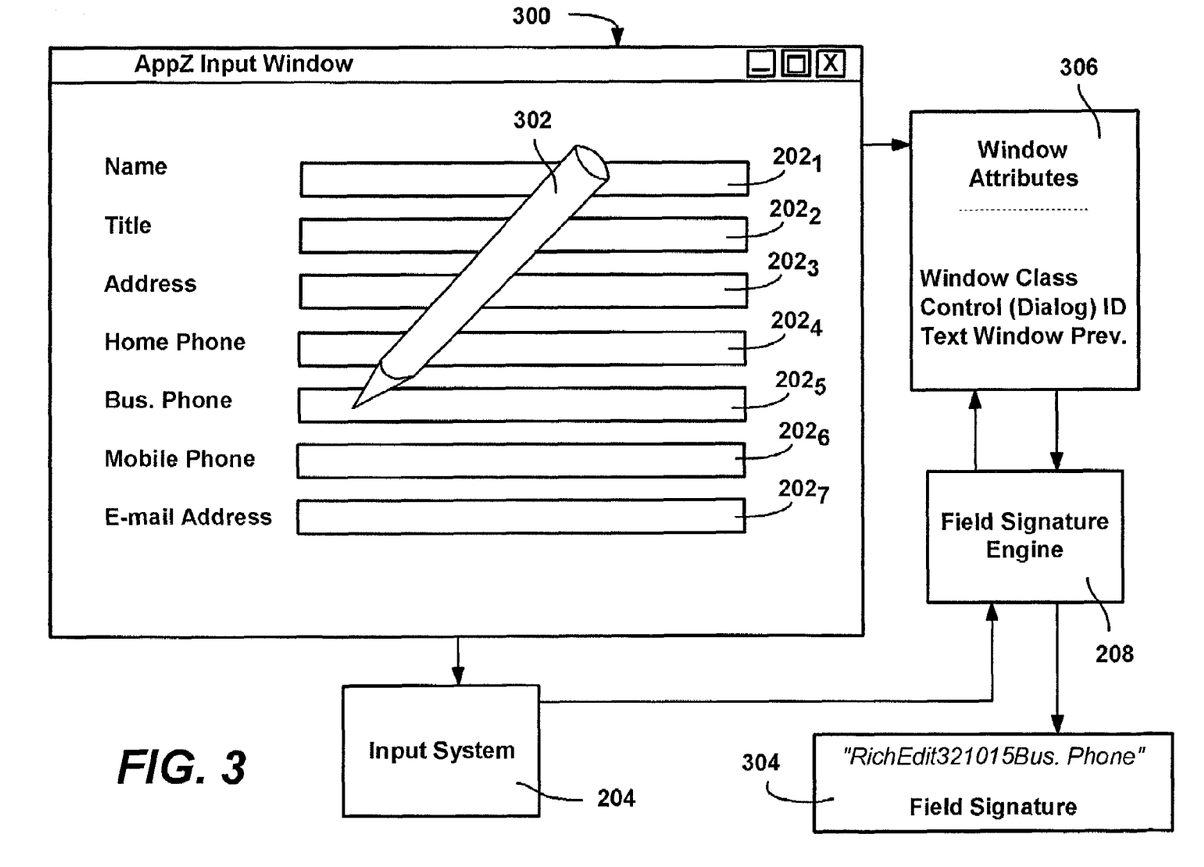
FIG. 3 is a block diagram generally representing generation of a field signature in accordance with one aspect of the present invention.

FIG. 3 represents the general way in which a field signature may be generated, for both predefined mapping of factoids and recognition-related operations. The field signature engine 208 may generate the field signature of a field while the application runs, whereby the field signature may be comprised of static attributes and run-time instantiated characteristics. In general, the field signature uniquely identifies a field type, to some adequate extent, along with a factoid for that field that is stored in a field mapping database 210.

As represented in FIG. 3, an application input window 300 (e.g., of the application 200 of FIG. 2), which may be the main application window itself or a child window of the application, includes a number of input fields $202_1$-$202_7$, which are also typically individual windows, (but may be windowless). As is understood, although seven such input fields are shown, any number of fields may be present on a given user interface. To develop a field signature for a given field, the field signature engine 208 obtains window attributes and/or other information for a selected field, e.g., via an API call to the operating system. For example, the input system 204 detects input activity directed to a field, such as the field $202_5$, (having a pen 302 shown contacting it), and calls the field signature engine 208 to provide it with a field signature. Note that once obtained, this field signature can be used for mapping operations, or during actual runtime for recognition operations, as described below.

In one implementation, to generate a field signature 304, the field signature engine 208 concatenates the attributes 306 of the currently-focused field (window) $202_5$, including window class data, the control (dialog) identifier and the text preceding the window $202_5$ to develop a unique signature. In FIG. 3, this signature ("RichEdit321015Bus. Phone") is represented by the concatenated strings "RichEdit32" (the window class), "1015" the dialog identifier, and "Bus. Phone" (the static text preceding the window). In general, this information has been found to be sufficiently unique to avoid signature collisions, although global uniqueness is a viable alternative. Note, however, that signature collisions are not necessarily undesirable, for example, as a factoid for a field of one application may be usable as the factoid for a field of another application, and thus if the signature that is generated was the same for both application fields the same factoid would be identified, but no real harm would result since both would be the same type of (e.g., business phone number) fields. Indeed, the field signature engine 208 can be configured to automatically convert certain field signatures to others to facilitate the sharing of factoids and/or user bias data corresponding thereto.

However, to reduce the chance of collisions, other information is available to develop a field signature, including program file name, file version, company, product name, product version, window style, and so forth. Note that while each additional piece of information reduces the chance of a collision, each additional piece increases the chance that a signature will not map to a factoid in the field mapping database 210. For example, using an application program version number in the signature will not locate the factoid when a new version of the application program is installed and run. In alternate implementations, more flexible matching systems may be implemented, e.g., look for an exact match, and if not found, look for a looser match (e.g., ignore version data when no match is found) to help locate a corresponding factoid.

Once obtained, the signatures may be used as is, (e.g., as a binary string), or alternately may be hashed or otherwise arranged in some way to facilitate a rapid lookup operation. In any event, for mapped fields, the signature acts (directly or indirectly) as a key to a corresponding factoid mapped into the field mapping database 210, as described above. In this manner, existing fields (edit fields, combination-box fields, and so forth) are mapped into a schema of factoids of predefined types. Note that for existing applications, this mapping is performed by generating the field signature for each field. Alternatively, for applications developed with advance knowledge of the present invention, application developers can declaratively set the factoid for a field at design time, and this factoid can be extracted via standard (e.g., Component Object Model, or COM) interfaces at program runtime. For example, as shown in FIG. 2, if a context-bias aware application program 214 is developed, the program 214 can provide its factoid-related information 216 to the field signature engine 208 or other suitable component which can automatically construct or copy one ore more factoids therefrom, and store each factoid in the field mapping database 210, indexed by a suitable field signature. Note however, that in any event, during program run time when the user is entering natural input data, system components, rather than the program, handle the context-based recognition external to and independent of the running program, which means that each application does not have to be written to deal with natural input, and need only be capable of receiving computer codes such as ASCII text or Unicode characters.

Further, note that some existing applications already validate their input fields, and this validation information may be provided to the recognizer via a factoid, or in addition to a factoid, thereby enhancing recognition accuracy. For example, a program (such as a network program) may have controls that validate user input, e.g., before sending a request to a server, client input is validated to determine whether the input is possibly valid at the server. Other applications have edit controls that themselves limit the data that can be entered in a given field (e.g., a field that receives a four-digit year). Such controls or the like (or the validation information extracted therefrom) can be provided to a suitable recognizer or other component, which can use the validation information to eliminate any candidates that do not meet the validation criteria. For example, in sophisticated programs, validations may be done by regular expressions, e.g., "up to three letters, then a dash, then two numbers followed by a lowercase letter," and this information may be exposed, whereby it can be fed to the recognizer as part of or in addition to the factoid.

Returning to FIG. 2, another aspect of the invention is represented, namely obtaining the user-specific data for each mapped field. As described above, in addition to providing a field-specific factoid for use in recognition, the present invention provides user-specific data for each mapped field to bias the recognition result. Although the user-specific data (user-bias data) can be obtained in many ways, including by asking the user to manually input such data, in one preferred implementation the user bias data is automatically harvested by a user harvesting engine 220 from various data stores 222. Because these data stores may be intermittently available, or reading them may incur significant latency, (such as in a network scenario), the user bias database typically stores a replica of the data in a user bias database 224. Further, because such user information is sensitive, security may be employed, such as by storing the user bias database data in encrypted form on a secure file system.

In general, the user bias harvesting engine 220 operates as a background process (so as to not noticeably interfere with user input, display, recognition and so forth), and may access operating system data, software application data, private data stores, and network services to retrieve user-specific factoid information. For example, in one preferred implementation, the user bias harvesting engine will access the most recently used (MRU) list of e-mail recipients. As described below, a list of likely recipients that may include the MRU list is handed to the natural input recognition engine 206 at run-time when the field signature indicates an e-mail address field, whereby the recognition engine 206 heavily biases toward these known e-mail addresses, greatly improving recognition accuracy of naturally input e-mail names. Note however that the context-biased recognition advantage is not limited to e-mail names that are in the MRU list, but can work with e-mail names from other data sources.

Figure 4:
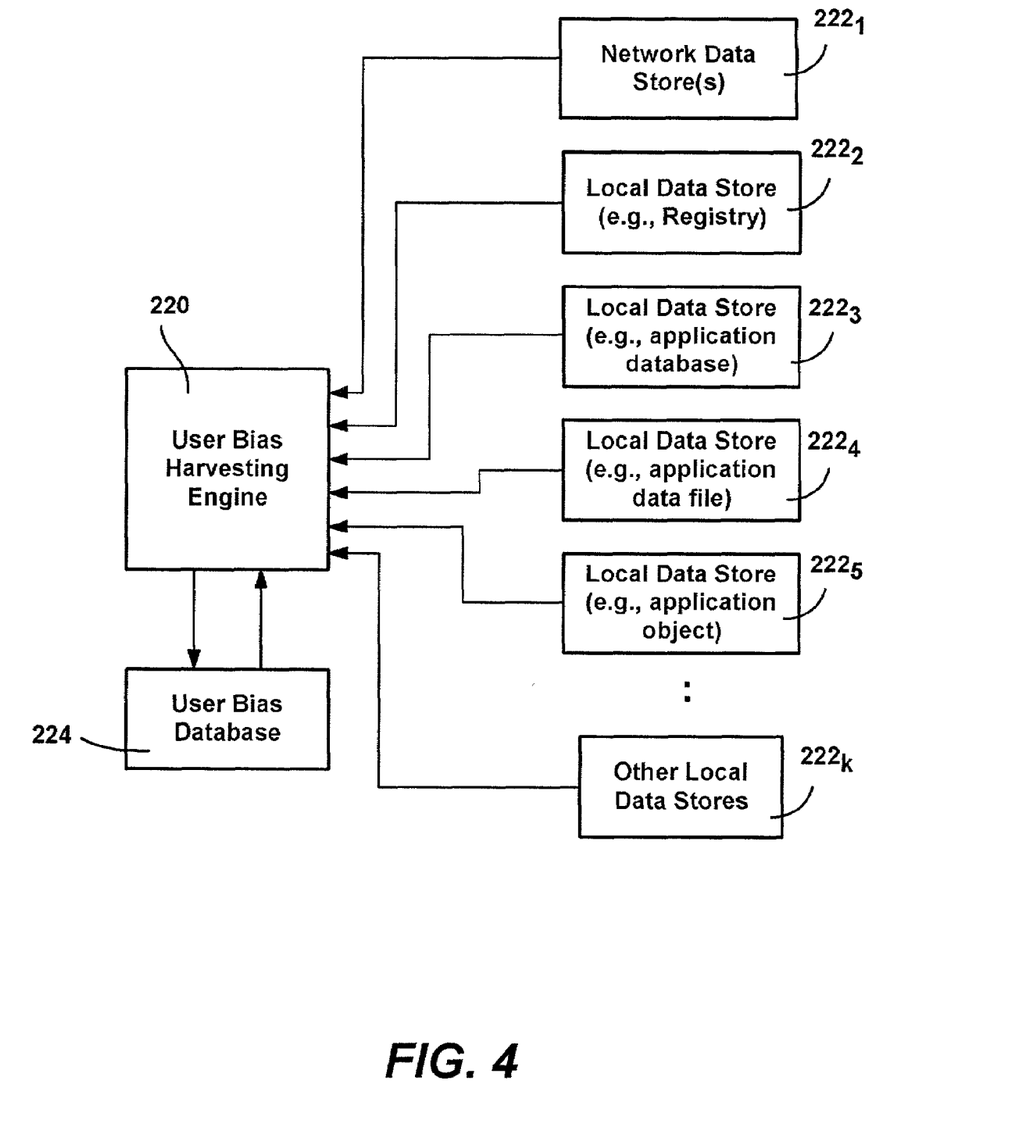
FIG. 4 is a block diagram generally representing the harvesting of user bias data in accordance with one aspect of the present invention.

Other data stores may be accessed, such as one that maintains the most recently entered URL's, for building up a set of user bias data for URL-address-entry-type fields. As can be appreciated, such local (and remote) data mining examples (e.g., most recently opened files of an application) are numerous. For example, as represented in FIG. 4, data stores may include one or more network data stores $222_1$, the system registry $222_2$ (for data such as the most recently used URLs and the most recent run command), application databases $222_3$, application data files $222_4$, application objects $222_5$ and other local data stores $222_k$. Other data stores may include the disk, to find the most recently touched files, and the recent files folder, to find file names. Since the stores may vary in the way they are accessed and in the way they maintain data, the user bias harvesting engine 220 adjusts to the type of data being accessed. For example, the user bias harvesting engine 220 may interface with a specific application's external COM object model, or it may access the registry, open specific files, or query other application-specific databases. The user bias harvesting engine 220 has the access rights and specific knowledge to access the users' data stores on the machine, or receive the information from the program.

Figure 5:
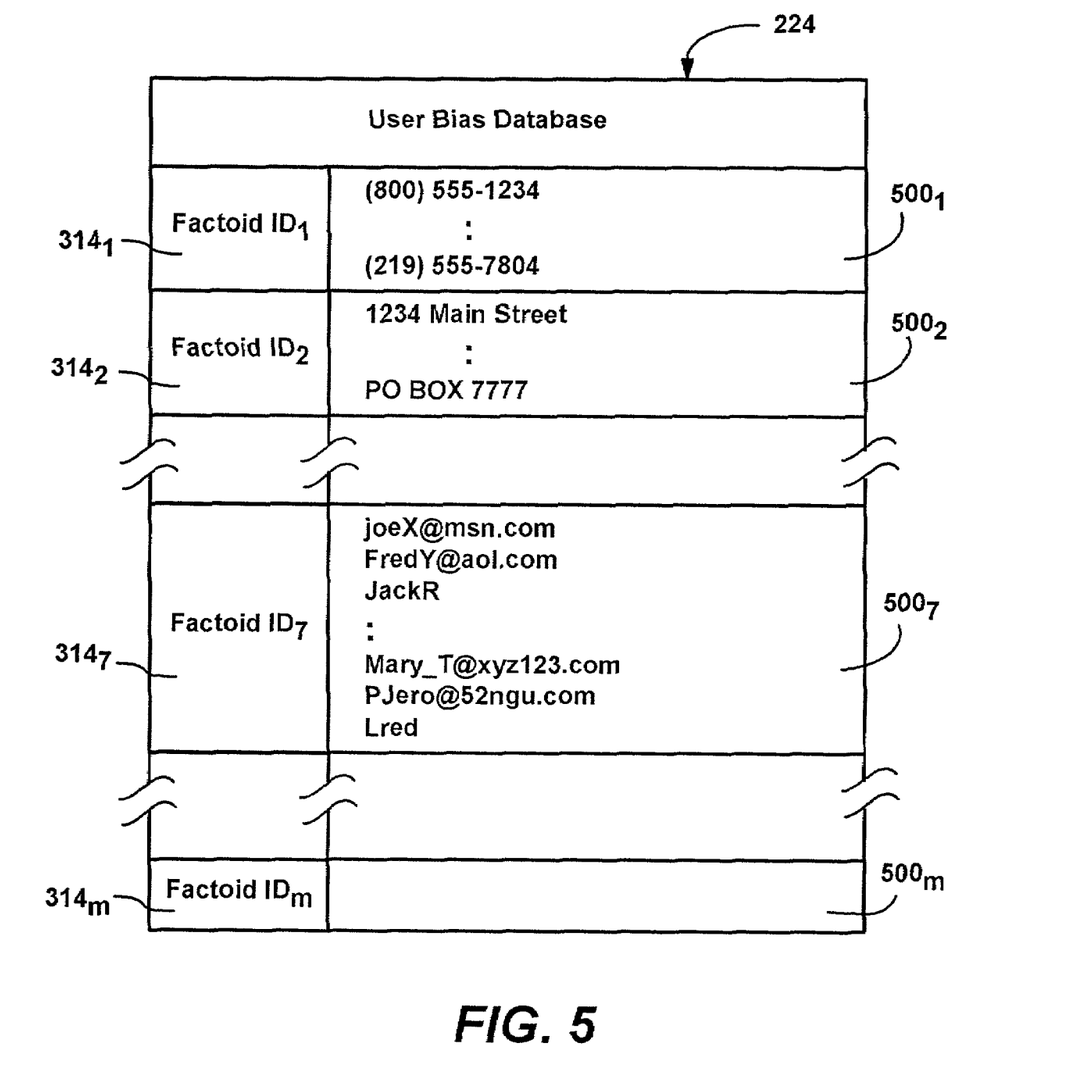
FIG. 5 is a representation of a user bias database containing harvested user bias data in accordance with one aspect of the present invention.

FIG. 5 shows one way in which the harvested data may be maintained in the user bias database 224, namely indexed by the corresponding factoid identifier (which may comprise the field signature). The data may be maintained in virtually any format, (e.g., as comma delimited records, tables, objects, and so forth), and will generally be referred to herein as sets of user bias data $500_1$-$500_m$. The datasets may be compressed in some way, arranged as desired such as for binary searching or so as to search the most frequently used entries first, differently weighted in some way from the recognizer's perspective, and/or may be encrypted to secure the data, at least some of which is likely to be sensitive.

Regardless of how maintained, each set of user bias data can be thought of as a small dictionary or list that the recognition engine biases towards, such as by searching only the user bias data unless no adequate match (e.g., to a sufficient percentage certainty) is found in the user bias data. Note that the user bias database 218 may be shipped with default information, such as a dataset including a list of the fifty most popular URLs obtained from a survey or the like. Further, note that a set of user bias data (e.g., the set $500_m$) may be empty, such as if a factoid exists for a program's field but the user has not yet entered anything into that field. Indeed, it may be desirable to intentionally not keep user bias data for a given factoid, such as for fields that call for regularly variable data, such as date or time field. In such an event, the recognizer may be given rules via a factoid, but no (e.g., a Null set of) user bias data.

With the various factoids and user bias data available, at runtime of a program the input system 204 of the present invention detects activity (e.g., speech or handwriting) directed toward entering natural input data at a program field. The input system 204 obtains the relevant factoid, obtains any corresponding user bias data, and, when the natural input data is collected, provides the factoid, user bias data and the natural input data to an appropriate natural input recognition engine 206.

The natural input recognition engine 206 uses the factoid to limit its recognition result to a result set that complies with the factoid's requirements, e.g., by discarding candidates that do not meet the factoid rules. The natural input recognition engine 206 also biases its recognition result set based on any provided user bias data, such as by searching any user bias data list (or lists) first, or weighing candidates located therein more heavily than those in another dictionary, such as the full-text dictionary normally used for general text. Note that the present invention is not directed to any particular type of recognizer, but preferably uses one that can implement factoid behavior to limit the possible outputs based on the factoid (type) and/or to accept one or more external lists of user bias data and bias its results toward the user bias data. Indeed, a straightforward way to adapt an existing recognizer for use with the present invention is to provide it with a pointer to such a list and have the recognizer use that list first. Only if the recognizer failed to locate a suitable match in the list would the recognizer access its full-text dictionary. A more sophisticated recognizer would also use the factoid, however as can be appreciated, the input system 204 or other system component (rather than the recognizer) may be configured to reject results that do not comply with the factoid. In fact, it is feasible to implement a system that improves recognition without changing an existing recognition engine in any way, as long as the input system or another entity can reject non-factoid compliant results and/or control the dictionary or dictionaries that the recognizer accesses, so that the recognition engine will look at the user bias data for a given field instead of a less focused dictionary.

Figure 6:
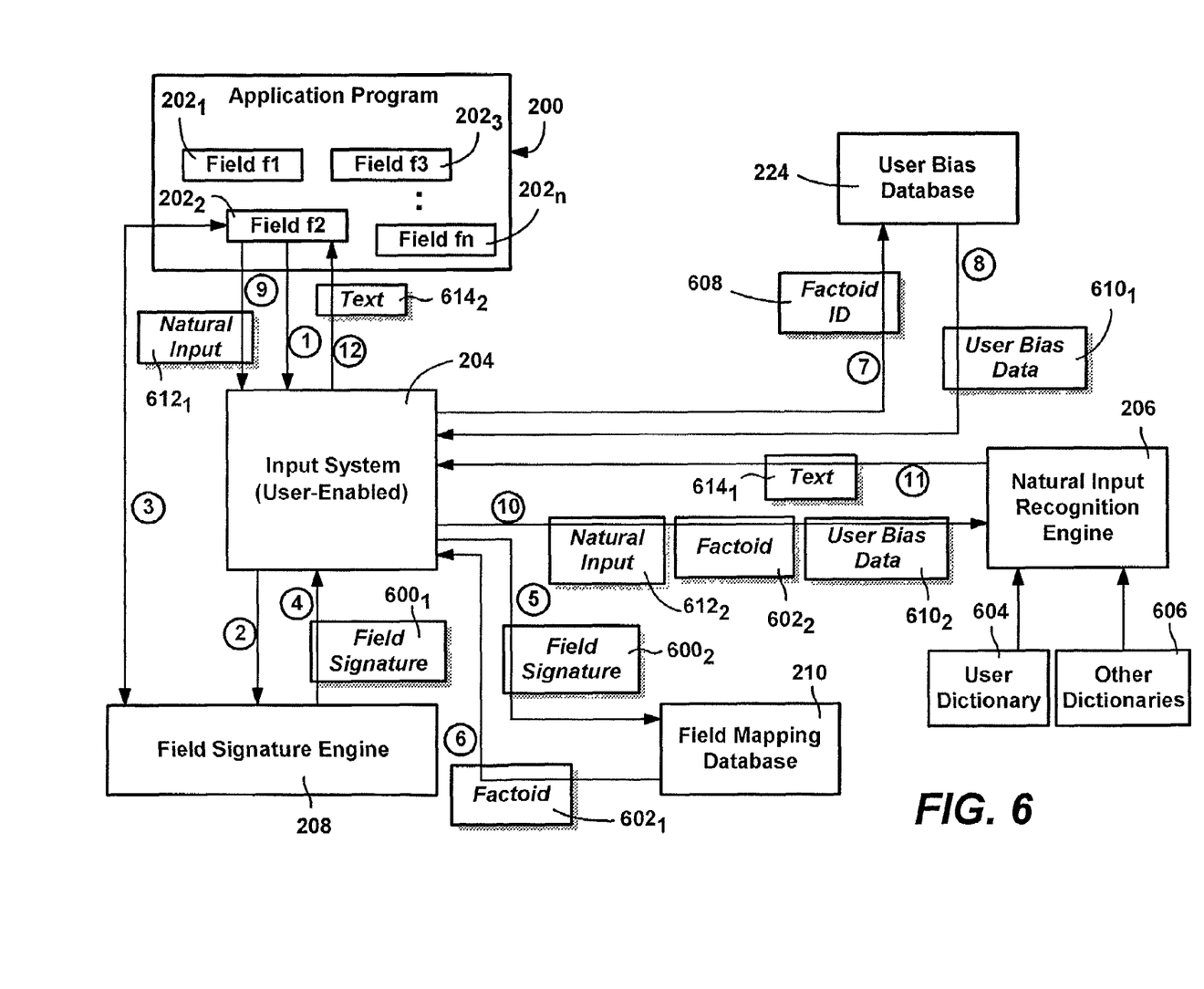
FIG. 6 is a representation of the components operating to provide user biased data and a factoid to a recognizer to provide a context-biased recognition result in accordance with one aspect of the present invention.
Figure 7:
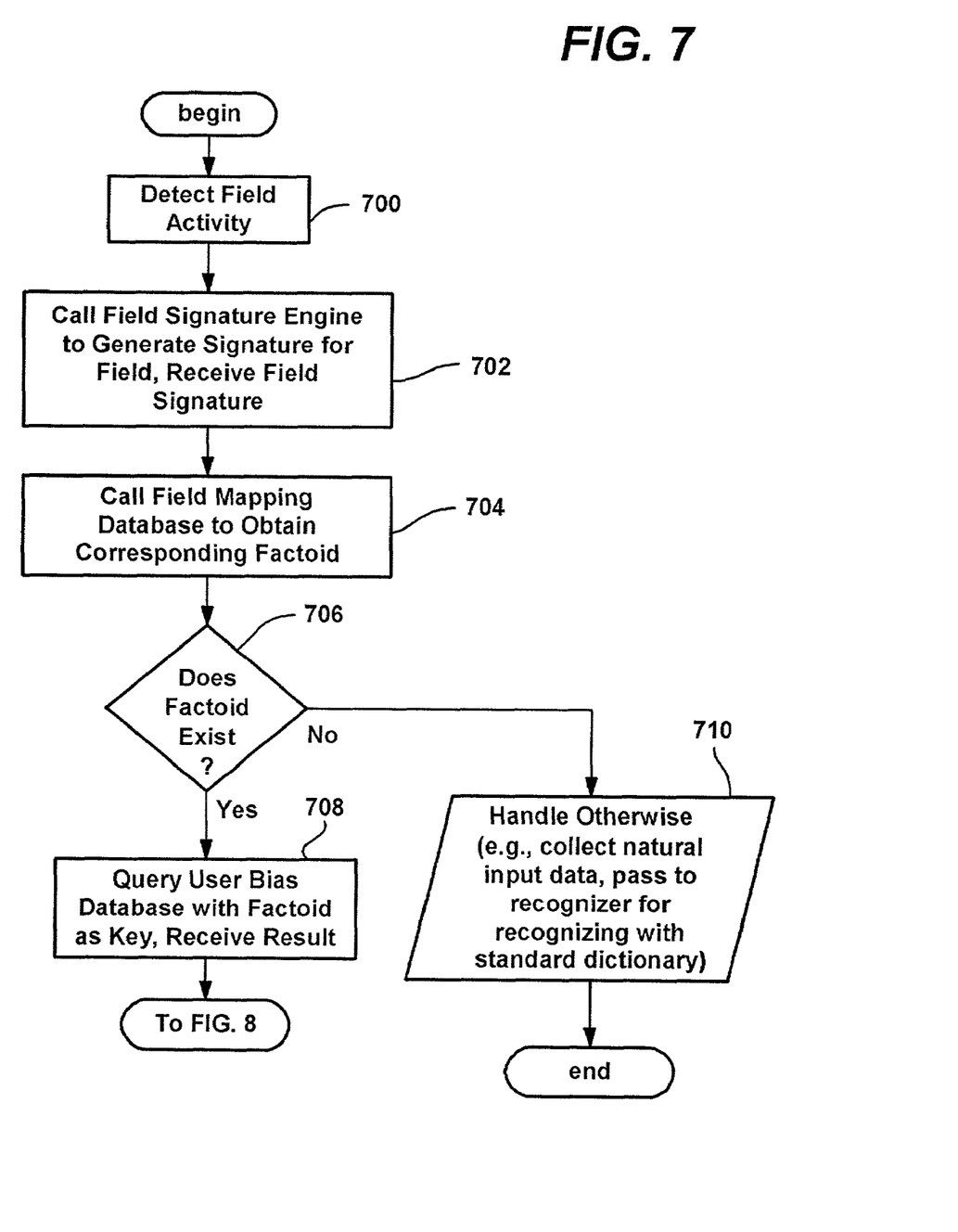
FIGS. 7 and 8 comprise a flow diagram generally representing operation of the various components including the input system to provide context-biased recognition in accordance with one aspect of the present invention.
Figure 8:
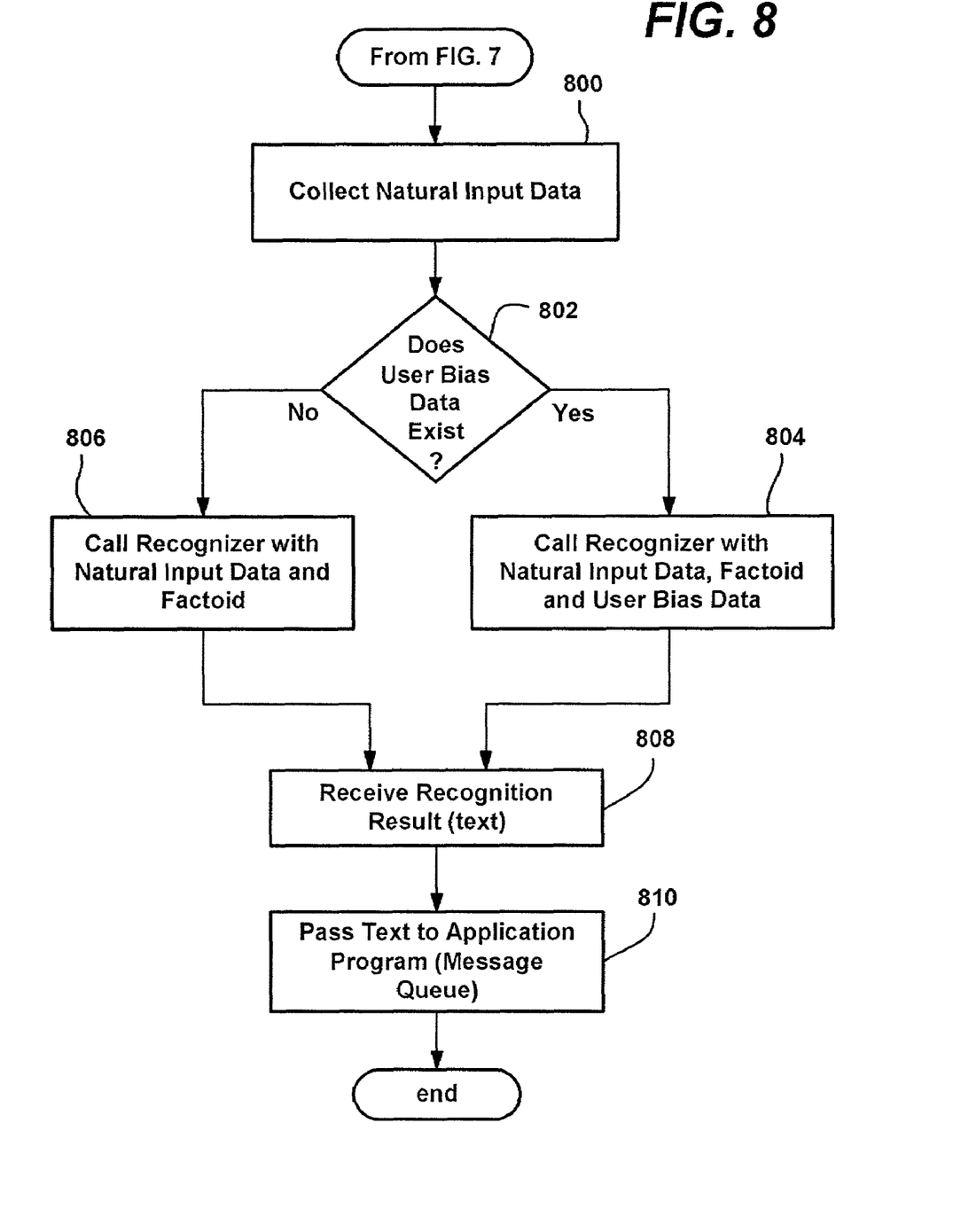

Turning to an explanation of the operation of the present invention, the block diagrams of FIG. 6 and the flow diagrams of FIGS. 7 and 8 describe how recognition of natural input data input to an application 200 at runtime is biased based on a determined context (field type). Note that FIGS. 6-8 describe the runtime operation of the components, wherein as described above, factoids have been previously mapped in the field mapping database 210 for at least some of the fields of the application program 200, and that the user bias data has been harvested or otherwise exists for at least some of the mapped fields, as also described above.

In FIG. 6, the arrows labeled with circled numerals describe the general flow of data throughout the system, and correspond to many of the steps of FIGS. 7 and 8. It should be emphasized however, that many of the components, their structure and functions are only one way to implement the present invention, and that some or all of the components and their functionality may be combined into a lesser number of components, or further separated into more components. As will also be understood, some or all of the functionality of one component may be moved into one or more other components.

As represented in FIG. 6 by the arrow labeled one (1) and in FIG. 7 by step 700, the process generally starts when natural input data activity is detected in a field (e.g., 200$_2$) that has current focus. Preferably, the system does not wait for the user to complete data entry in a field, but rather initiates the factoid retrieval and user bias data retrieval part of the process, so as to be ready when the user's data entry (which is relatively slow) is completed. For example, in one implementation, the field signature engine starts whenever focus changes to a different field. Thus, in the present example, a pen down event may trigger the initial part of the process, (arrows one (1) through eight (8) in FIG. 6, steps 700-710 of FIG. 7), with a pen-up event, time-out and/or specific user action (an enter command or activity in another field) triggering the recognition part of the process (arrows nine (9) through twelve (12) in FIG. 6, steps 800-810 of FIG. 8).

When activity is detected at step 700 of FIG. 7, at step 702 of FIG. 7, the input system 204 calls the field signature engine 208 to determine the signature for the field 202$_2$, represented in FIG. 6 by the arrow labeled two (2). The field signature engine 208 analyzes the field's window attributes and constructs a field signature 600$_1$ therefor as described above, represented in FIG. 6 by the arrow labeled three (3). The field signature 600$_1$ is passed back to the input system 204, represented in FIG. 6 by the arrow labeled four (4) and also in step 702 of FIG. 7.

With the field signature (or some value corresponding thereto such as a hash) data 600$_2$ as a key, the input system queries the field mapping database 210 for a factoid. This is generally represented in FIG. 6 by the arrow labeled five (5), and in FIG. 7 via step 704. Note that alternatively, the field signature engine 208 may query the field mapping database 210 directly, and provide a factoid (or some indication such as an errorcode indicating that no factoid exists for the signature) in response to a call by the input system 204. In either alternative, if a factoid 602$_1$ exists, (step 706 of FIG. 7), the input system 204 winds up with the factoid, as represented in FIG. 6 by the arrow labeled six (6) and in FIG. 8 by step 804 or step 806. Note that if no factoid exists, the input system 204 is given an error message or the like, resulting in step 710 or the like being executed. Step 710 represents handling the natural input in some other way, such as by passing it to the natural input recognition engine 206 without a factoid or user bias data, whereby the natural input will be recognized with another dictionary or dictionaries 604 (such as a full text dictionary) and/or a user dictionary 606.

In accordance with one aspect of the present invention, when a factoid exists, corresponding user bias data, if any, is obtained to bias the recognition. To this end, an identifier 608 for the factoid (which may be the field signature or another adequately unique value corresponding thereto) is used as a key to query the user bias database 224, as represented in FIG. 6 by the arrow labeled seven (7) and in FIG. 7 by step 708. The process then continues to FIG. 8.

When the user has finished entering the natural input data 612$_1$, as detected in some way by the input system 202, (e.g., a pen-up event, time-out and/or specific user action), the input system collects the natural data 612$_1$. This is generally represented in FIG. 6 by the arrow nine (9) and in FIG. 8 by step 800.

In the event that user bias data 610$_1$ exists at step 802, as determined via the query at step 708 with the supplied factoid ID 608, the user bias data 610$_1$ is available to the input system 204, represented in FIG. 6 by the arrow labeled eight (8). Again, note that many of these functions are interchangeable, e.g., the field signature engine 208 could directly call the field mapping database 210 and/or the user bias database 224 and thereby return the factoid and user bias data to the input system 202. Regardless of how obtained, if the user bias data 610$_1$ exists at step 802, the factoid 602$_2$ and user bias data 610$_2$ (e.g., a pointer to a buffer containing it) may be passed to the recognition engine 206 to provide context-biased recognition.

Thus, in accordance with an aspect of the present invention, if the user bias data 610$_1$ exists, the input system passes the natural input data 612$_2$, the factoid 602$_2$ and the user bias data (e.g., a pointer thereto) 610$_2$ to the natural input recognition engine 206. This is generally represented in FIG. 6 by the arrow labeled ten (10) and in FIG. 8 by step 804. Context-biased recognition is thus performed as generally described above.

In the event the user bias data does not exist at step 802, the input system passes the natural input data 612$_2$ and the factoid 602$_2$ to the natural input recognition engine 206, as represented by step 806. Although operating without the benefit of user bias data, in keeping with the present invention, the factoid information generally enables the recognition engine 206 to produces a result superior to the natural input data alone.

Step 808 of FIG. 8 and the arrow labeled eleven (11) in FIG. 6 represents the recognition result being returned by the recognizer 206, with step 810 of FIG. 8 and the arrow labeled twelve (12) in FIG. 6 representing the input system 202 making the result (e.g. a text string) available to the application program 200. For example, the input system 202 may place the text string in a window message queue that the application reads, similar to how text is received when entered via a conventional keyboard.

As can be seen from the foregoing detailed description, there is provided a natural input recognition system and method that uses a contextual mapping engine and adaptive user bias to significantly improve recognition accuracy. Via recognition that is tailored to a determined context via a factoid and/or user bias data associated with that context, recognition accuracy is substantially improved. At the same time, while applications can be written to provide factoids for their input fields, the architecture of the present invention enables non-recognition aware applications to benefit from context-biased recognition.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a method for recognizing natural human input, the method comprising:
    an act of detecting, at a system component, natural input data directed to an input field from a plurality of input fields of an executing program, wherein the natural input data comprises an input other than textual input, the natural input data entered into the computing device by a user of the computing device;
    an act of calling a field signature engine to obtain a field signature for the input field;
    an act of receiving a field signature for the input field from the field signature engine, the field signature representing the context of the input field, the field signature having been constructed from an analysis of the attributes of the input field;
    an act of using the field signature as a key to query a field mapping database for a factoid for the represented context;
    an act of receiving a factoid from the field mapping database, the factoid containing contextual rules to more accurately recognize that natural input data;
    an act of using the factoid as a key to query a user bias database for user bias data;
    an act of receiving using bias data that can be used to further refine the recognition of the natural input data, within the represented context and in combination with the contextual rules, to more accurately recognize that natural data input;
    an act of submitting the natural input data, the factoid, and the user bias data to a recognition engine so that the recognition engine can use the contextual rules contained in the factoid and the user bias data to perform context-based recognition of the natural data input; and
    an act of receiving a recognition result of the natural input data from the recognition engine for inclusion in the input field, the recognition result biased by the user-specific biasing information within the represented context.

2. The method of claim 1 wherein the user biasing information comprises previously entered user data that is more likely to be a recognition result of the natural input data based on the represented context of the input field.

3. The method of claim 2 wherein the factoid is developed based on communicating with the executing program.

4. The method of claim 2 wherein receiving the recognition result to the executing program includes providing the factoid to a recognition engine.

5. The method of claim 1 wherein the user biasing information comprises a set of user bias data.

6. The method of claim 5, further comprising:
    maintaining the set of user bias data in a user bias database.

7. The method of claim 5 further comprising, harvesting the user bias data from at least one data store accessible to the computing device.

8. The method of claim 1 wherein the input field corresponds to a window, and wherein generating a field signature includes acquiring window attribute data.

9. The method of claim 1 wherein the natural input data comprises speech or handwriting data.

10. A computer system comprising:
    one or more processors;
    system memory; and
    one or more computer-readable media having stored thereon computer-executable instructions representing the following:
    a human input recognition engine configured to convert natural input data to recognition results, wherein the natural input data comprises an input other than textual input, each recognition result comprising at least one computer code;
    a field determination mechanism that determines contexts for at least some input fields of executable programs as determined contexts;
    at least one field mapping database that maintains rules corresponding to determined contexts;
    at least one user bias database that maintains biasing information for a plurality of the determined contexts; and
    an input system configured to:
    1) detect natural input data directed to an input field from among a plurality of input fields of the executing program, the natural input data entered into the computing device by a user of the computing device;
    2) call the field determination mechanism to obtain the determined context of the input field to which the natural input data is directed;
    3) receive a field signature for the input field from the field determination mechanism, the field signature representing the determined context of the input field, the field signature having been constructed from an analysis of the attributes of the input field;
    4) use the field signature as a key to query a field mapping database for a factoid for the represented context;
    5) receive a factoid from the file mapping database, the factoid containing contextual rules to more accurately recognize that natural input data;
    6) use the factoid as a key to query a user bias database for user bias data;
    7) receive using bias data that can be used to further refine the recognition of the natural input data, within the represented context and in combination with the contextual rules, to more accurately recognize that natural data input;
    8) communicate the natural input data, the factoid, and the user bias data to the recognition engine so that the recognition engine can use the rules contained in the factoid and the user bias data to perform context-based recognition of the natural data input;
    9) receive a recognition result from the recognition engine, the recognition result from analyzing the natural input data based on the rules in the factoid and the user-specific biasing information for the input field; and 10) provide to the executing program at least one computer code corresponding to the recognition result received from the recognition engine.

11. The system of claim 10 wherein the field determination mechanism includes a field signature engine that generates a field signature corresponding to the context based on characteristics of the input field.

12. The system of claim 11 wherein the characteristics of the input field include text displayed proximate the field.

13. The system of claim 10 wherein the natural input data comprises speech or handwriting data.

14. The system of claim 10 wherein the field determination mechanism includes a field signature engine that generates a field signature corresponding to the field type based on characteristics of the input field.

15. The system of claim 10 wherein the at least one database of biasing information comprises a database of sets of user bias data, and wherein the input system communicates the biasing information including a set of user bias data to the recognition engine.

16. The system of claim 15, wherein the user bias data set communicated to the recognition engine is retrieved from the database of sets of user bias data based on the field type determined by the field determination mechanism.

17. The system of claim 15 wherein the database is securely maintained on the computing device.

18. The system of claim 15 further comprising a data harvesting engine that obtains at least some of the user bias data from at least one data store accessible to the computing device.

19. The system of claim 18 wherein the database of sets of user bias data includes at least some data that was not harvested by the harvesting engine.

20. The system of claim 18 wherein the data harvesting engine operates as a background process.

21. The system of claim 10 wherein the at least one database of biasing information comprises a first database of factoids and a second database of sets of user bias data, and wherein the input system communicates the biasing information including a factoid and a set of user bias data to the recognition engine.

22. The system of claim 21 wherein the factoid and the user bias data are retrieved from their respective databases based on the field type.

23. The system of claim 21 wherein the factoid includes information corresponding to at least one criterion with which the recognition result should comply.

24. In a computing device, a system comprising:

a field determination mechanism that determines a context of an input field from among a plurality of input fields in an executable program and provides a field signature representative thereof;

a field mapping database indexed by field signatures that contains contextual rules to more accurately recognize natural input data and provide a factoid of rules for a context represented by a field signature;

a database of biasing information indexed by factoid that includes sets of user bias data used to further refine the recognition of natural input data, within a represented context and in combination with the contextual rules, to more accurately recognize natural input data and to provide user bias data for a represented context;

an input system configured to receive natural input data directed towards the input field, to obtain a factoid from the field mapping database, and to obtain user bias data corresponding to the factoid, wherein the natural input data comprises an input other than textual input, the user bias data corresponding to the factoid for the input field differing from user bias data corresponding to factoids for one or more other input fields of the executable program;

a human input recognizer that converts natural input data to computer codes, the recognizer configured to receive the factoid, the user bias data and the natural input data from the input system, to analyze the natural input data based on the user bias data and the rules contained in the factoid, and to provide a recognition result comprising a set of at least one computer code to the input system based on the natural input data, the rules contained in the factoid and the user bias data, the recognition result biased by the user bias data; and the input system returning data to the executable program that corresponds to the recognition result.

25. The system of claim 24 wherein the field determination mechanism comprises a field signature engine that generates a field signature for the field.

26. The system of claim 24 wherein the factoid includes information corresponding to at least one criterion with which the recognition result should comply.

* * * * *